US011835420B2

(12) United States Patent
Sun et al.

(10) Patent No.: US 11,835,420 B2
(45) Date of Patent: Dec. 5, 2023

(54) METHOD AND DEVICE FOR DIAGNOSING A ROBOT

(71) Applicant: ABB Schweiz AG, Baden (CH)

(72) Inventors: Heqing Sun, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 200 days.

(21) Appl. No.: 17/296,674

(22) PCT Filed: Dec. 24, 2018

(86) PCT No.: PCT/CN2018/123257
§ 371 (c)(1),
(2) Date: May 25, 2021

(87) PCT Pub. No.: WO2020/132840
PCT Pub. Date: Jul. 2, 2020

(65) Prior Publication Data
US 2022/0050016 A1    Feb. 17, 2022

(51) Int. Cl.
*G01M 13/045* (2019.01)
*B25J 9/16* (2006.01)
*B25J 19/00* (2006.01)
*G01H 1/12* (2006.01)
*G05B 19/4063* (2006.01)

(52) U.S. Cl.
CPC ......... *G01M 13/045* (2013.01); *B25J 9/1674* (2013.01); *B25J 19/0095* (2013.01); *G01H 1/12* (2013.01); *G05B 19/4063* (2013.01); *G05B 2219/39001* (2013.01); *G05B 2219/39056* (2013.01)

(58) Field of Classification Search
None
See application file for complete search history.

(56) References Cited

U.S. PATENT DOCUMENTS 9,898,815 B2 * 2/2018 Yamamoto .............. G06T 7/001
2008/0215292 A1   9/2008 Kato et al.

FOREIGN PATENT DOCUMENTS

| CN | 101114171 A | 1/2008 |
| CN | 101644623 A | 2/2010 |
| CN | 108638128 A | 10/2018 |

(Continued)

OTHER PUBLICATIONS

Chinese National Intellectual Property Administration, International Search Report in International Patent Application No. PCT/CN2018/123257, 5 pp. (dated Sep. 23, 2019).

(Continued)

*Primary Examiner* — Raul J Rios Russo
*Assistant Examiner* — Carl F. R. Tchatchouang
(74) *Attorney, Agent, or Firm* — Leydig, Voit & Mayer, Ltd.

(57) ABSTRACT

Methods and devices for diagnosing a robot. A method includes obtaining a spectrum of a motion signal generated by a rotating component of the robot during operation of the robot. A frequency amplitude of a sub-component of the rotating component is determined from the spectrum, based on a physical characteristic and a speed of the sub-component. A failure of the sub-component is detected by comparing the frequency amplitude with a threshold amplitude.

12 Claims, 4 Drawing Sheets

(56) References Cited

FOREIGN PATENT DOCUMENTS

| EP | 1304463 A1 | * | 4/2003 | ............. F01D 21/00 |
|----|------------|---|--------|--------------------------|
| EP | 1304463 A1 |   | 4/2003 |                          |
| EP | 1882922 A2 | * | 1/2008 | .......... G01M 13/021   |
| EP | 1882922 A2 |   | 1/2008 |                          |
| JP | 2000-164992 A |   | 5/2000 |                       |

OTHER PUBLICATIONS

Chinese National Intellectual Property Administration, Written Opinion in International Patent Application No. PCT/CN2018/123257, 3 pp. (dated Sep. 23, 2019).
European Patent Office, Extended European Search Report in European Patent Application No. 18945211.3, 9 pp. (dated Jul. 12, 2022).
Zhang et al., "Diesel Engine Fault Diagnosis Technology," *National Defense Industry Press*, 4 pp. (Dec. 1, 2015).
China National Intellectual Property Administration, Office Action in Chinese Patent Application No. 201880099887.0, 8 pp. (dated Sep. 13, 2023).

\* cited by examiner

METHOD AND DEVICE FOR DIAGNOSING A ROBOT

CROSS-REFERENCE TO RELATED APPLICATIONS

This patent application is a U.S. national phase patent application of International Patent Application No. PCT/CN2018/123257, filed Dec. 24, 2018, which is fully incorporated herein by reference for all purposes.

TECHNICAL FIELD

Example embodiments of the present disclosure generally relate to robot diagnosis and more particularly, to a method and device for diagnosing a robot.

BACKGROUND

Robots play important parts in modern industries since they are able to work faster, more precise and run longer than us human beings. With more robots operating automatically, it is more and more important to discover faults that may cause losses in performances or even plant downtime as early as possible in order to minimize impact on the users' operation.

The main solutions in the prior art focus on robot abnormality detection on system level to diagnose the robot. However, these solutions are not able to identify the failure source on subassembly level, making the diagnosis/identification of the failure source inaccurate.

In addition, other solutions in the prior art require the robot first to stop working, and then measure the data of the robot under specific motion cycle. Then, the measured data are compared with the historical data of the robot with the same motion cycle to identify failure source. These methods need specific motion cycle which will interrupt normal production processes and lead to economic losses.

SUMMARY

Example embodiments of the present disclosure propose a solution for diagnosing a robot.

In a first aspect, example embodiments of the present disclosure provide a method for diagnosing a robot. The method comprises: obtaining a spectrum of a motion signal generated by a rotating component of the robot during operation of the robot; determining a frequency amplitude of a sub-component of the rotating component from the spectrum, based on a physical characteristic and a speed of the sub-component; and detecting a failure of the sub-component by comparing the frequency amplitude with a threshold amplitude.

In some embodiments, detecting the failure comprises: in response to the frequency amplitude exceeding the threshold amplitude, detecting that the sub-component has the failure.

In some embodiments, obtaining the spectrum of the motion signal comprises: obtaining the motion signal in a time domain; resampling the motion signal with a sampling rate determined based on the speed of the rotating component; and determining the spectrum based on the resampled motion signal.

In some embodiments, the physical characteristic comprises one or more structural parameters and/or one or more dimensional parameters of the sub-component.

In some embodiments, the motion signal indicates at least one of the following: a rotational speed of the rotating component; a control current of the rotating component; a torque of the rotating component; and an acceleration of the rotating component.

In some embodiments, the sub-component comprises at least one of following part: a gear of a gearbox; a shaft of a motor; and a bearing of the motor or gearbox.

In a second aspect, example embodiments of the present disclosure provide a device for diagnosing a robot. The device comprises a controller and a memory coupled to the controller and storing machine-executable instructions which, when executed by the controller, cause the robot to perform acts comprising: obtaining a spectrum of a motion signal generated by a rotating component of the robot during operation of the robot; determining a frequency amplitude of a sub-component of the rotating component from the spectrum, based on a physical characteristic and a speed of the sub-component; and detecting a failure of the sub-component by comparing the frequency amplitude with a threshold amplitude.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
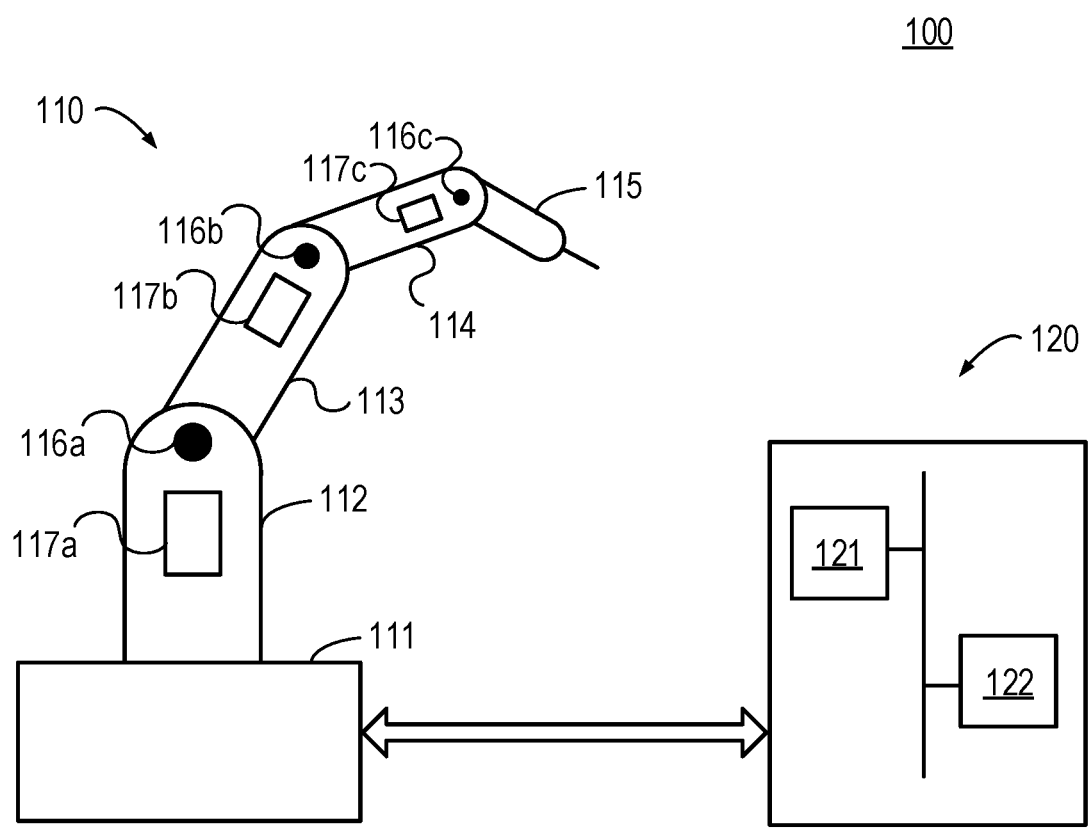
FIG. 1 shows a block diagram illustrating an industrial robot and a device for diagnosing the robot in accordance with some example embodiments of the present disclosure.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

FIG. 1 shows a block diagram illustrating an industrial robot and a device for diagnosing the robot in accordance with some example embodiments of the present disclosure. The robot 110 comprises a base 111, three arms 112, 113, 114 and a tool holder 115. The arms 113, 114 and the tool holder 115 are rotatable about a plurality of joints 116a-116c. The industrial robot also comprises a plurality of actuator 117a-117c for driving the movements of the arms 112, 113, 114. Each actuator 117a-117c comprises a motor including a motor shaft and a transmission unit configured to transfer rotational movements of the motor shaft to the joints. Each transmission unit comprises a gear and a gear shaft.

The industrial robot 110 is connected to a device 120 for executing robot program, which comprises a controller 121 and a memory 122. The memory 122 is coupled to the controller 121 and storing machine-executable instructions. The device 120 may be configured to transmit a control signal to the industrial robot 110 to control the operation of the actuator 117a-117c of the industrial robot 110, such as the rotation of the motor in the actuator 117a-117c. At the same time, the device 120 can also be configured to receive feedback signals from the industrial robot 110 to monitor and diagnose the operation state of the industrial robot 110.

Figure 2:
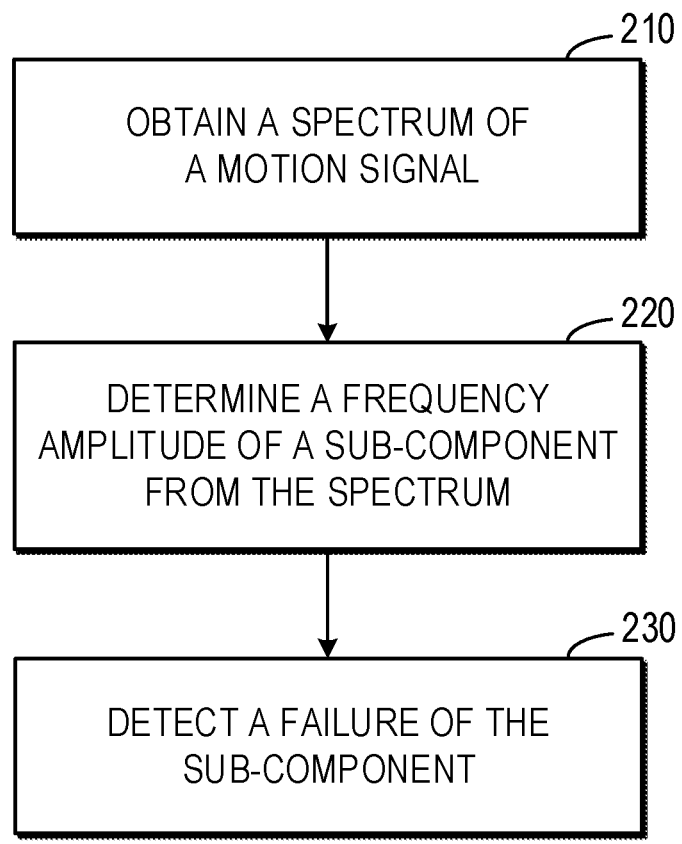
FIG. 2 illustrates a flowchart of a method for diagnosing a robot in accordance with some example embodiments of the present disclosure.

FIG. 2 illustrates a flowchart of a method 200 for diagnosing a robot in accordance with some example embodiments of the present disclosure. The method 200 can be implemented by the device 120 as shown in FIG. 1 to carry out a robot diagnose.

At 210, a spectrum of a motion signal is obtained. The motion signal is generated by a rotating component of the robot during operation of the robot. The rotating component may be the actuator 117a-117c of the robot 110. The motion signal may indicate a rotational speed of the rotating component, a control current of the rotating component, a torque of the rotating component, or an acceleration of the rotating component.

At 220, a frequency amplitude of a sub-component of the rotating component is determined from the spectrum, based on a physical characteristic and a speed of the sub-component. The rotating component may comprise a plurality of sub-components, which may be a gear or bearing inside the gearbox, a shaft or a bearing of the motor, or other structural components in the actuator 117a-117c. The physical characteristic comprises one or more structural parameters and/or one or more dimensional parameters of the sub-component.

Based on the physics analysis, each sub-component of the rotating component has a characteristic frequency, which is dependent on the sub-component structural parameter and/or dimensional parameter, like gear tooth number, bearing ball number, and bearing inner/outer raceway diameter.

The characteristic frequency is further dependent on the rotation speed of the sub-component. For example, the characteristic frequency of a gear may be k*ω, where ω is the rotation speed and k is the structural/dimensional parameter of the gear.

Such parameters of the sub-components can be predetermined and stored in the device 120. The rotation speed of the sub-components can be directly measured by sensors or indirectly calculated through other measured data such as the angular position of the motor. Such measurement is usually included in the robot for normal operation, thereby no additional cost is increased.

Through the characteristic frequency of the sub-component, the frequency amplitude corresponding to the sub-component can be determined from the spectrum.

At 230, a failure of the sub-component can be detected by comparing the frequency amplitude with a threshold amplitude. By failure analysis of the robot 110, the frequency amplitude of each sub-component can be considered as an indicator, which indicates whether a sub-component of the rotating component in the robot 110 has a failure.

In this manner, it is possible to detect a failure on sub-assembly level in the robot, thereby more accurately determining the failure source. As a result, the user can be prompted earlier than before to perform appropriate repairs and replacements, which can extend the life of the robot.

The diagnostic results can be displayed to the user, for example, via a graphical user interface, allowing the user to visually identify the failure source and take appropriate action.

In some embodiments, if the frequency amplitude of the sub-component exceeds the threshold amplitude, the sub-component will be detected as having failure. The threshold amplitude may be empirically predetermined by the user or learned from historical robot data.

Figure 3:
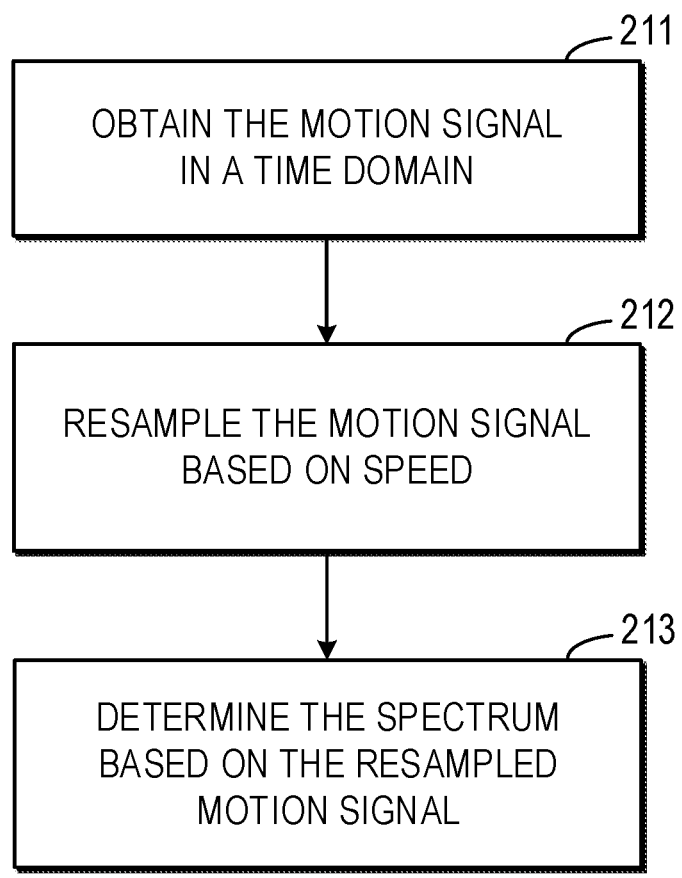
FIG. 3 illustrates a flowchart of the method for diagnosing a robot shown in FIG. 2 in accordance with some example embodiments of the present disclosure.

FIG. 3 illustrates a flowchart of 210 of the method 200 for diagnosing a robot shown in FIG. 2 in accordance with some example embodiments of the present disclosure. The method 210 can be implemented by the device 120 as shown in FIG. 1 to obtain the spectrum of the motion signal.

At 211, the motion signal in a time domain is obtained. The motion signal may be the signals of specific joint in a time interval during which the actuator 117a-117c is rotating. The motion signal may be voltage or current measured by the sensors within the robot 110 and transmitted through the cable between the robot 110 and the device 120. The motion signal could also be measured by external sensors installed on the robot, such as accelerometer.

At 212, the motion signal in the time domain is resampled with a sampling rate. The sampling rate may be determined based on the speed of the rotating component. For example, the sampling rate is proportional to the speed of the rotating component, so that more sample values are obtained when the speed is high. In this way, the impact of varying speed (which happens during acceleration and deceleration) can be removed, thereby improving the reliability and accuracy of spectrum analysis.

At 213, the spectrum is determined based on the resampled motion signal. For example, the spectrum may be determined through Fourier transformation.

In this manner, it is possible to directly use the motion signal obtained during normal operation of the robot for failure diagnosis, rather than the motion signal from a specific operation mode, thereby avoiding the interruption of industrial production.

It should be understood that the above-described methods of obtaining the spectrum are merely exemplary and are not intended to limit the scope of the disclosure. For example, when the rotating component does not vary its speed, the obtained motion signal can be directly converted from the time domain into the frequency domain without resampling.

Figure 4:
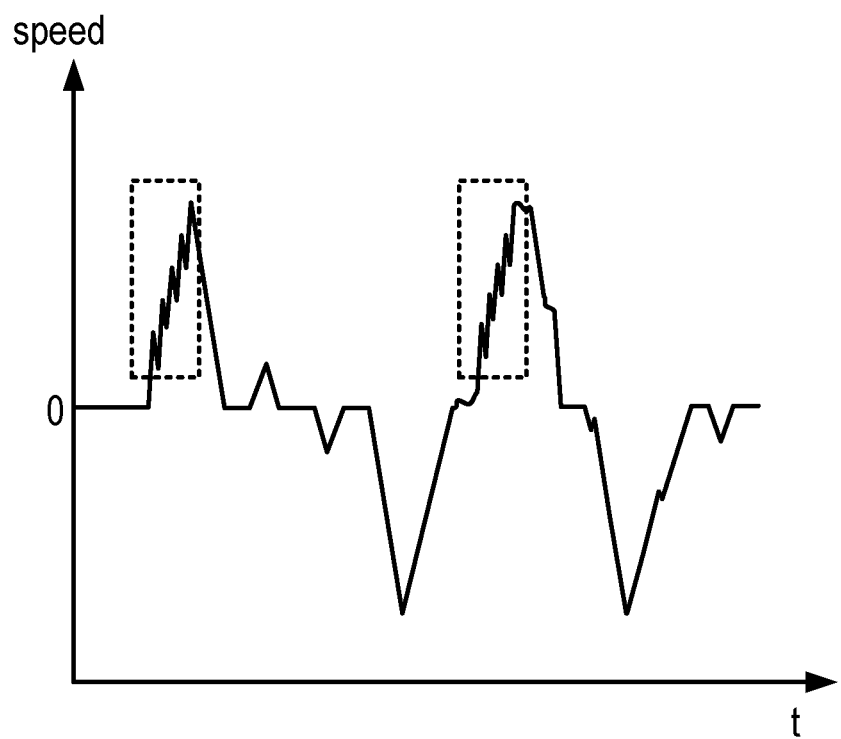
FIG. 4 illustrates a diagram showing a waveform of motion signal in accordance with some example embodiments of the present disclosure.

FIG. 4 illustrates a diagram showing a waveform of motion signal in accordance with some example embodiments of the present disclosure. It can be seen that the waveform of the motion signal in the FIG. 4 is not strictly periodic, but has some fluctuations, for example referring to the part in the dotted box. Sources of these fluctuations may be, for example, a change in load or a potential failure of components. Therefore, a diagnostic analysis is needed to determine the cause of the fluctuations.

Figure 5:
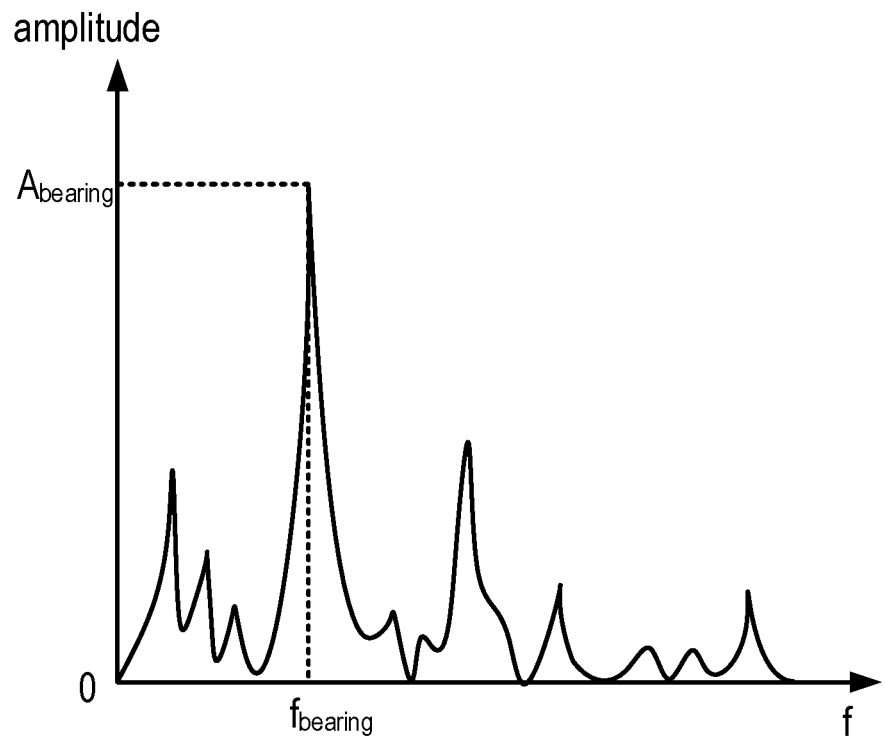
FIG. 5 illustrates a diagram showing a spectrum of motion signal in accordance with some example embodiments of the present disclosure.

FIG. 5 illustrates a diagram showing a spectrum of motion signal in accordance with some example embodiments of the present disclosure. It can be seen that the frequency amplitudes corresponding to some frequencies in the FIG. 5 are significantly higher than the frequency amplitudes corresponding to other frequencies. Since each sub-component has an individual characteristic frequency, the diagnosis can be performed by comparing the frequency amplitude value corresponding to the characteristic frequency with a preset threshold amplitude value.

For example, FIG. 5 shows the characteristic frequency $f_{bearing}$ of motor bearing, which is depend on the structural or dimensional parameters of the bearing, such as ball number, diameter of the bearing raceway, and the rotating speed of the bearing. Through the spectrum illustrated in FIG. 5, the frequency amplitude $A_{bearing}$ corresponding to the characteristic frequency $f_{bearing}$ can be determined. Such frequency amplitude $A_{bearing}$ can be used as an indicator of whether the motor bearing has a failure, such as cracks or pitting on the bearing ball or raceway. If the frequency amplitude $A_{bearing}$ exceeds the threshold amplitude of the motor bearing, then it can be determined that the bearing has a failure.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 2. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for diagnosing a robot, comprising:
    obtaining a spectrum of a motion signal generated by a rotating component of the robot during operation of the robot, wherein the motion signal comprises a plurality of different rates of acceleration of the rotating component;
    determining a frequency amplitude of a sub-component of the rotating component from the spectrum, based on a physical characteristic and a speed of the sub-component;
    detecting a failure of the sub-component by comparing the frequency amplitude with a threshold amplitude; and sending a control signal, based on detecting the failure, to a user device, wherein the control signal provides for a user to take appropriate responsive action.

2. The method of claim 1, wherein detecting the failure comprises:

in response to the frequency amplitude exceeding the threshold amplitude, detecting that the sub-component has the failure.

3. The method of claim 1, wherein obtaining the spectrum of the motion signal comprises:

obtaining the motion signal in a time domain, resampling the motion signal with a sampling rate determined based on the speed of the rotating component; and determining the spectrum based on the resampled motion signal.

4. The method of claim 1, wherein the physical characteristic comprises one or more structural parameters and/or one or more dimensional parameters of the sub-component.

5. The method of claim 1, wherein the motion signal indicates at least one of the following:

a rotational speed of the rotating component;

a control current of the rotating component;

a torque of the rotating component; and an acceleration of the rotating component.

6. The method of claim 1, wherein the sub-component comprises at least one of the following:

a gear of a gearbox;

a shaft of a motor; or a bearing of a motor or a gearbox.

7. A device for diagnosing a robot, comprising:

a controller; and a memory coupled to the controller and storing machine-executable instructions which, when executed by the controller, cause the robot to perform acts comprising:

obtaining a spectrum of a motion signal generated by a rotating component of the robot during operation of the robot, wherein the motion signal comprises a plurality of different rates of acceleration of the rotating component;

determining a frequency amplitude of a sub-component of the rotating component from the spectrum, based on a physical characteristic and a speed of the sub-component;

detecting a failure of the sub-component by comparing the frequency amplitude with a threshold amplitude; and sending a control signal, based on detecting the failure, to a user device, wherein the control signal provides for a user to take appropriate responsive action.

8. The device of claim 7, wherein detecting the failure comprises:

in response to the frequency amplitude exceeding the threshold amplitude, detecting that the sub-component has the failure.

9. The device of claim 7, wherein obtaining the spectrum of the motion signal comprises:

obtaining the motion signal in a time domain;

resampling the motion signal with a sampling rate determined based on the speed of the rotating component;

determining the spectrum based on the resampled motion signal.

10. The device of claim 7, wherein the physical characteristic comprises one or more structural parameters and/or one or more dimensional parameters of the sub-component.

11. The device of claim 7, wherein the motion signal indicates at least one of the following:

a rotational speed of the rotating component;

a control current of the rotating component;

a torque of the rotating component; and an acceleration of the rotating component.

12. The device of claim 7, wherein the sub-component comprises at least one of the following:

a gear of a gearbox;

a shaft of a motor; or a bearing of a motor or a gearbox.

* * * * *